United States Patent
Kawase

(10) Patent No.: US 11,724,541 B2
(45) Date of Patent: Aug. 15, 2023

(54) CYLINDER BOOT FOR AXLE OF INDUSTRIAL VEHICLE

(71) Applicant: KABUSHIKI KAISHA TOYOTA JIDOSHOKKI, Kariya (JP)

(72) Inventor: Yokei Kawase, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 14 days.

(21) Appl. No.: 17/365,333

(22) Filed: Jul. 1, 2021

(65) Prior Publication Data

US 2022/0009282 A1 Jan. 13, 2022

(30) Foreign Application Priority Data

Jul. 7, 2020 (JP) ................................. 2020-116801

(51) Int. Cl.
*B60B 35/00* (2006.01)
*B62D 5/06* (2006.01)
(Continued)

(52) U.S. Cl.
CPC ............ *B60B 35/003* (2013.01); *B62D 5/062* (2013.01); *B62D 5/12* (2013.01); *B62D 7/18* (2013.01); *B60B 2900/212* (2013.01)

(58) Field of Classification Search
CPC ... F16D 3/845; F16J 3/041; F16J 15/52; F16J 15/56; F15B 15/1461; B62D 15/0225;
(Continued)

(56) References Cited

U.S. PATENT DOCUMENTS 3,870,335 A * 3/1975 Schulz ................... B62D 7/22
280/90
5,379,856 A * 1/1995 Blee ....................... F16J 15/52
74/18.2
(Continued)

FOREIGN PATENT DOCUMENTS

DE 10 2004 030 233 A1 1/2006
EP 3 439 151 A1 2/2019
(Continued)

OTHER PUBLICATIONS

Extended European Search Report dated Nov. 24, 2021 from the European Patent Office in EP Application No. 21179552.1.

*Primary Examiner* — Drew J Brown
*Assistant Examiner* — Timothy Wilhelm
(74) *Attorney, Agent, or Firm* — Sughrue Mion, PLLC

(57) ABSTRACT

A cylinder boot for an axle of an industrial vehicle includes a cylinder boot body, a rod-side fixing portion, a cylinder-side fixing portion, and a detection portion. The cylinder boot covers a cylinder rod of a steering hydraulic cylinder. The cylinder boot body has a contractable portion that is contractable in response to a stroke of the cylinder rod. The rod-side fixing portion is disposed at one end portion of the cylinder boot body and fixed to a distal end portion of the cylinder rod. The cylinder-side fixing portion is disposed at the other end portion of the cylinder boot body and fixed to a cylinder body of the steering hydraulic cylinder. The detection portion is displaced in a direction in which the cylinder rod extends or contracts, and is detected by a detection sensor disposed on the beam axle.

7 Claims, 7 Drawing Sheets

(51) Int. Cl.
*B62D 5/12* (2006.01)
*B62D 7/18* (2006.01)

(58) Field of Classification Search
CPC . B62D 5/12; B62D 5/062; B62D 7/18; B62D 7/16; B60B 35/003; B66F 9/07568; G01B 11/26
See application file for complete search history.

(56) References Cited

U.S. PATENT DOCUMENTS

| | | | | |
|---|---|---|---|---|
| 6,047,788 | A * | 4/2000 | Bohner | F15B 11/0365 |
| | | | | 92/151 |
| 6,098,742 | A * | 8/2000 | Cartwright | B62D 5/24 |
| | | | | 180/429 |
| 6,220,969 | B1 * | 4/2001 | Lilley | F16D 3/845 |
| | | | | 403/381 |
| 6,267,395 | B1 * | 7/2001 | Howard | B62D 6/04 |
| | | | | 280/90 |
| 6,550,350 | B2 * | 4/2003 | Martin | B62D 3/12 |
| | | | | 277/637 |
| 6,598,697 | B2 * | 7/2003 | Oishi | B62D 7/18 |
| | | | | 180/428 |
| 6,679,504 | B2 * | 1/2004 | Delorenzis | F16F 5/00 |
| | | | | 280/5.512 |
| 6,817,620 | B1 * | 11/2004 | Howard | B62D 7/228 |
| | | | | 280/90 |
| 7,484,743 | B2 * | 2/2009 | Gorodisher | B62D 7/228 |
| | | | | 280/90 |
| 7,967,687 | B2 * | 6/2011 | Yamamoto | F16J 3/043 |
| | | | | 464/175 |
| 9,168,947 | B2 * | 10/2015 | Shiino | B62D 5/0409 |
| 9,505,081 | B2 * | 11/2016 | Nakagawa | F16D 3/227 |
| 10,578,213 | B2 * | 3/2020 | Larson | B62D 3/12 |
| 11,066,099 | B2 * | 7/2021 | Czajkowski | B62D 7/18 |
| 11,152,840 | B2 * | 10/2021 | Matsuto | G01D 5/145 |
| 2008/0157490 | A1 * | 7/2008 | Hakui | B60G 7/006 |
| | | | | 280/5.521 |
| 2019/0107184 | A1 * | 4/2019 | Matsuto | F16H 25/20 |
| 2019/0170251 | A1 * | 6/2019 | Larson | F16J 3/041 |

FOREIGN PATENT DOCUMENTS

| | | |
|---|---|---|
| JP | 2006-160151 A | 6/2006 |
| JP | 3144024 U | 7/2008 |

* cited by examiner

CYLINDER BOOT FOR AXLE OF INDUSTRIAL VEHICLE

CROSS-REFERENCE TO RELATED APPLICATION

This application claims priority to Japanese Patent Application No. 2020-116801 filed on Jul. 7, 2020, the entire disclosure of which is incorporated herein by reference.

The present disclosure relates to a cylinder boot for an axle of an industrial vehicle.

BACKGROUND ART

A cylinder cover for an industrial vehicle disclosed in Japanese Patent Application Publication No. 2006-160151 is known as a conventional art related to a cylinder boot for an axle of an industrial vehicle, for example. The cylinder cover for an industrial vehicle disclosed in Japanese Patent Application Publication No. 2006-160151 protects, in a forklift, a cylinder rod of a steering cylinder mounted between a rod coupling-side knuckle arm of a steering knuckle, which makes relative displacement, and a rear beam axle of a vehicle body of the forklift. This cover includes a cover member that is stretchable and deformable in response to the extension or contraction of the cylinder rod of the steering cylinder.

According to the cylinder cover for an industrial vehicle disclosed in Japanese Patent Application Publication No. 2006-160151, the cover member has a sheet shape and is disposed between the rod coupling-side knuckle arm of the steering knuckle, which makes relative displacement, and the rear beam axle of the vehicle body to protect the cylinder rod of the steering cylinder from harmful objects, such as stones and/or mud. The cover member has a sheet shape and is elastic so that the cover member is stretchable and deformable in a direction in which the steering cylinder extends or contracts. This configuration allows the cover member to be compactly disposed in a sheet shape to block harmful objects that may fly toward the cylinder rod of the steering cylinder, thereby reducing the installation space for the cover.

Further, Japanese Registered Utility Model No. 3144024 discloses, as another conventional art, a mounting structure for mounting a cylinder boot on a movable-side member, wherein the cylinder boot covers a cylinder rod and the like of a cylinder of an industrial vehicle to protect the cylinder rod and the like from rain water, dust, and the like.

However, the cylinder cover for an industrial vehicle disclosed in Japanese Patent Application Publication No. 2006-160151 is not a member that covers the cylinder rod, and therefore may be inferior to the cylinder boot disclosed in Japanese Registered Utility Model No. 3144024, which covers the cylinder rod and the like, in terms of protection of the cylinder rod from foreign matters.

An industrial vehicle may detect whether the steering angle of a steered wheel has exceeded a threshold value. In this case, for example, as illustrated in FIG. 7, an beam axle 92 of a vehicle body 91 may be provided with a detection sensor 93, and a detection object 96 disposed on a steering knuckle 95 that is pivotable via a king pin 94. When a cylinder rod 97 extends or contracts in response to the steering operation, the steering knuckle 95 pivots so that the detection sensor 93 detects the detection object 96 and transmits a detection signal. This enables detection of whether or not the steering angle of the steered wheel has exceeded the threshold value. However, this configuration requires processing of the steering knuckle 95 for mounting the detection object 96 to the steering knuckle 95 or addition of a member, such as a bracket, for mounting the detection object 96. The detection sensor 93 and the detection object 96 are provided at positions where they easily get dirty and are likely to interfere with foreign matters, such as a stone flying from the road surface. Further, the mounting structure of the cylinder boot of Japanese Registered Utility Model No. 3144024 is merely a technique for facilitating the assembly of the cylinder boot.

The present disclosure, which has been made in light of the above-mentioned problem, is directed to providing a cylinder boot for an axle of an industrial vehicle, wherein the cylinder boot protects a cylinder rod and serves as a detection object used for detection of a steering angle.

SUMMARY

In accordance with an aspect of the present disclosure, there is provided a cylinder boot for an axle of an industrial vehicle. The industrial vehicle has a beam axle, a steering knuckle pivotably supported by the beam axle and a steering hydraulic cylinder supported by the beam axle. A cylinder rod of the steering hydraulic cylinder is connected to the steering knuckle to pivot the steering knuckle. The cylinder boot covers the cylinder rod of the steering hydraulic cylinder. The cylinder boot includes a cylinder boot body, a rod-side fixing portion, a cylinder-side fixing portion, and a detection portion. The cylinder boot body has a contractable portion that is contractable in response to a stroke of the cylinder rod. The rod-side fixing portion is fixed to a distal end portion of the cylinder rod. The cylinder-side fixing portion is fixed to a cylinder body of the steering hydraulic cylinder. The detection portion is displaced in a direction in which the cylinder rod extends or contracts, and is detected by a detection sensor disposed on the beam axle.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

A cylinder boot for an axle of an industrial vehicle according to an embodiment of the present disclosure will be described below with reference to the drawings. The present embodiment is an example of application to a tow tractor, which corresponds to the industrial vehicle of the present disclosure. The "front and rear", "right and left", and "up and down" described herein for specifying the direction are defined based on a state where the operator of the tow tractor is seated on a driver's seat of the driver's section and faces the forward side of the tow tractor.

Figure 1:
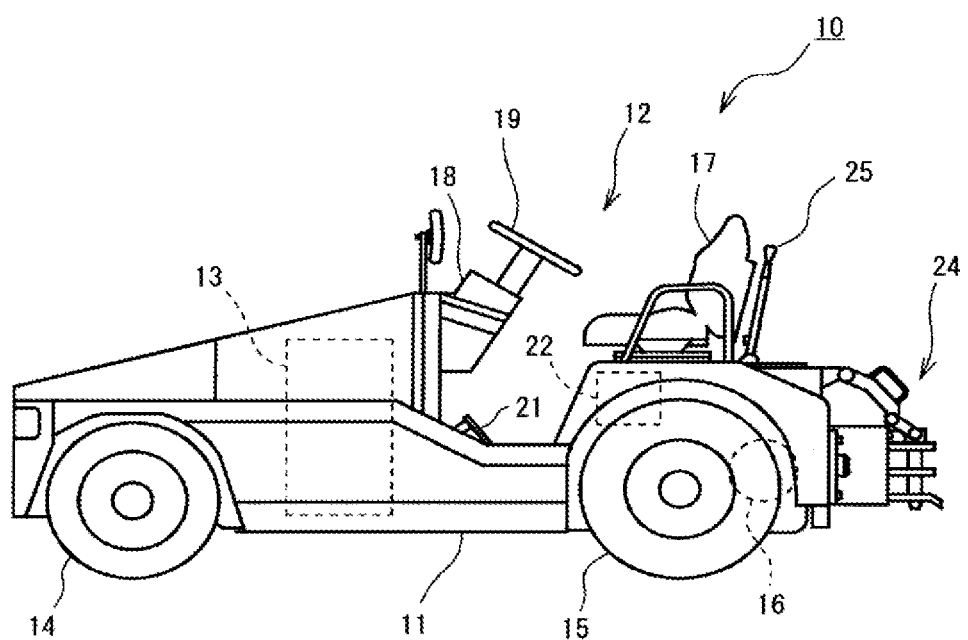
FIG. 1 is a side view of a tow tractor according to an embodiment of the present disclosure.

As illustrated in FIG. 1, a driver's section 12 is provided near the center of a vehicle body 11 of a tow tractor 10 that serves as a towing vehicle (i.e., the industrial vehicle of the present disclosure), and a battery 13 is accommodated in front of the driver's section 12 in the vehicle body 11. Steered wheels 14 as front wheels are provided in a front portion of the vehicle body 11, and driving wheels 15 as rear wheels are provided in a rear portion of the vehicle body 11. The vehicle body 11 is provided with a driving motor 16 as a driving device that generates driving force for driving the vehicle. A power transmission mechanism (not illustrated) that transmits the driving force of the driving motor 16 to the driving wheels 15 is provided between the driving motor 16 and the driving wheels 15. The tow tractor 10 of the present embodiment is a battery-type tow tractor that travels on the electric power of the battery 13 mounted on the vehicle body 11.

The driver's section 12 in the vehicle body 11 is provided with driver's seats 17 arranged on the right and left. FIG. 1 illustrates only one of the driver's seats 17. A steering column 18 is provided in front of the driver's seat 17. A steering wheel 19 for changing the steering angle of the steered wheels 14 is mounted on the steering column 18.

An accelerator pedal 21 is provided on a floor surface in front of the driver's seat 17. The tow tractor 10 controls driving of the driving motor 16 to adjust the vehicle speed in response to the pressing amount of the accelerator pedal 21 that is pressed down by the operator. A controller 22 that performs various controls of the tow tractor 10 is mounted below the driver's seat 17 in the vehicle body 11.

A drawbar device 24 that couples a towed vehicle, such as a wheeled platform, is provided in the rear portion of the vehicle body 11. A drawbar operating lever 25 is provided behind the driver's seat 17. The drawbar operating lever 25 is operated by the operator to cause the towed vehicle to be coupled to or decoupled from the drawbar device 24. The drawbar operating lever 25 is provided within the reach of the operator's hand in a state that the operator is seated on the driver's seat 17.

Figure 2:
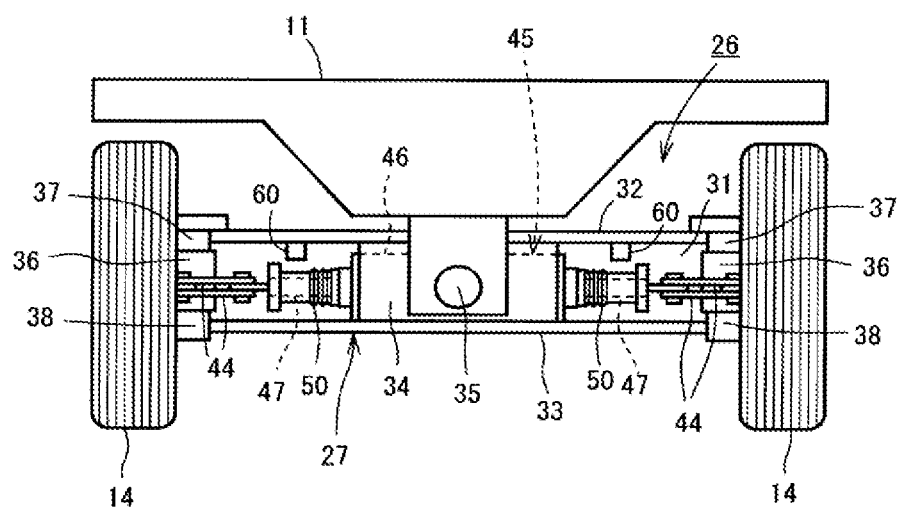
FIG. 2 is a front view of a front axle according to the embodiment of the present disclosure.

As illustrated in FIG. 2, the vehicle body 11 includes a front axle 26 in the front portion of the vehicle body 11, and the front axle 26 includes the steered wheels 14. The front axle 26 includes a front beam axle 27 that corresponds to the beam axle of the present disclosure and includes a base plate 31 extending in the right-left direction. The base plate 31 has an upper plate 32 and a lower plate 33 respectively on the upper portion and the lower portion of the base plate 31. The upper plate 32 and the lower plate 33 are fixed to the base plate 31 by welding, and a surface of the upper plate 32 and a surface of the lower plate 33 are parallel to each other. The base plate 31 has, in the front portion thereof, a connection plate 34 that connects the upper plate 32 and the lower plate 33. The longitudinal direction of the front beam axle 27 coincides with the width direction of the base plate 31, and a center pin 35 is inserted into the width center of the base plate 31. The front beam axle 27 is coupled to the vehicle body 11 by the center pin 35.

The front beam axle 27 is provided with a pair of steering knuckles 36 that are respectively disposed at the right end and a left end of the front beam axle 27. Each of the steering knuckles 36 is supported by an upper boss portion 37 and a lower boss portion 38 into which a king pin 39 inserted so that the steering knuckle 36 is pivotable to the right and left via the king pin 39. That is, the steering knuckles 36 is pivotably supported by the front beam axle 27. The shapes of the pair of steering knuckles 36 are symmetrical to each other.

Figure 3:
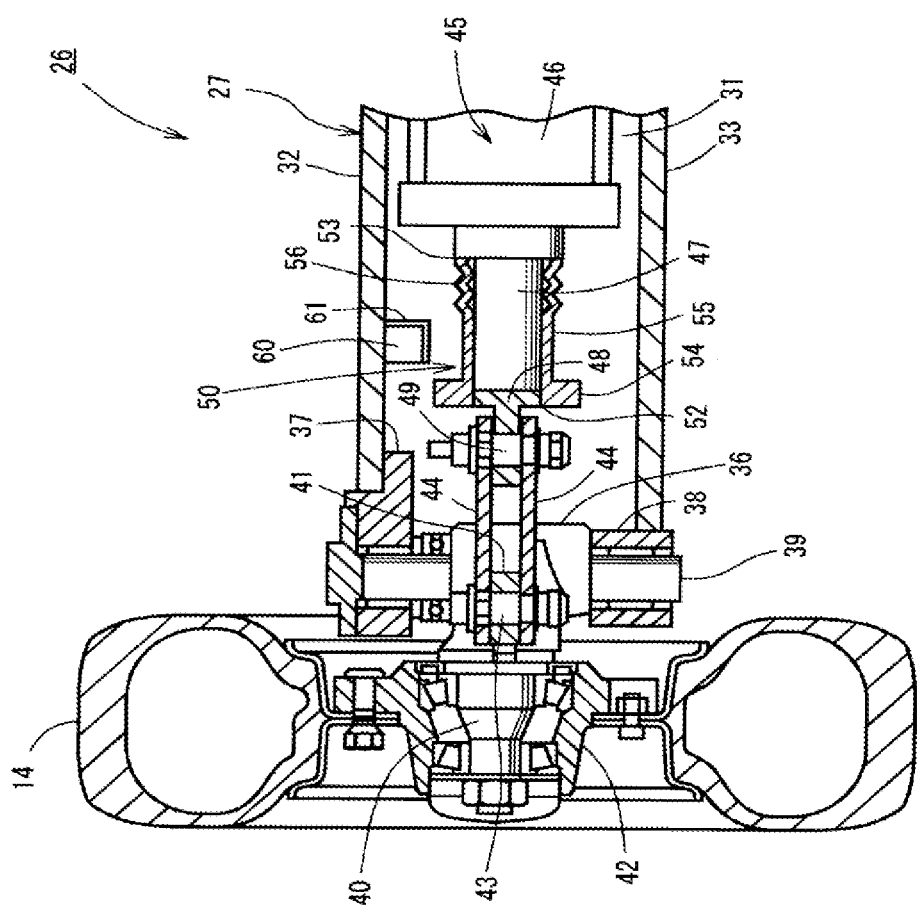
FIG. 3 is a cross-sectional front view of a main part of the front axle according to the embodiment of the present disclosure.

As illustrated in FIG. 3, the steering knuckle 36 has the king pin 39 extending in the up-down direction, a wheel spindle 40 protruding outward from the king pin 39 in the right-left direction of the vehicle body 11, and a knuckle arm 41 protruding frontward. An upper end portion of the king pin 39 protrudes upward from the steering knuckle 36, and a lower end portion of the king pin 39 protrudes downward from the steering knuckle 36. The wheel spindle 40 of the steering knuckle 36 supports the associated steered wheel 14 pivotally via a hub 42. The knuckle arm 41 has a distal end to which one ends of a pair of upper and lower tie rods 44 are pivotally coupled via a coupling pin 43. The tie rods 44 couple a steering hydraulic cylinder 45, which will be described below, and the steering knuckle 36. That is, the steering knuckle 36 is connected to and pivoted by the steering hydraulic cylinder 45.

As illustrated in FIG. 2, the steering hydraulic cylinder 45 (hereinafter simply referred to as "the hydraulic cylinder 45") is mounted to the front beam axle 27. The hydraulic cylinder 45 is a double-acting hydraulic cylinder that operates upon receiving supply of hydraulic oil in a hydraulic circuit (not illustrated). The hydraulic cylinder 45 includes a cylinder body 46 that is fixed to the base plate 31 by a bolt or the like (not illustrated). The inside of the cylinder body 46 is partitioned into two chambers by a piston (not illustrated). The piston is coupled to right and left cylinder rods 47 that respectively extend from the piston to the right and the left and protrude from the cylinder body 46. The cylinder rods 47 extend and contract in the right-left direction by the operation of the hydraulic cylinder 45. Each of the cylinder rod 47 has a distal end portion 48 that is pivotally coupled to the other ends of the tie rods 44 via a coupling pin 49 (see FIG. 3).

Figure 4A:
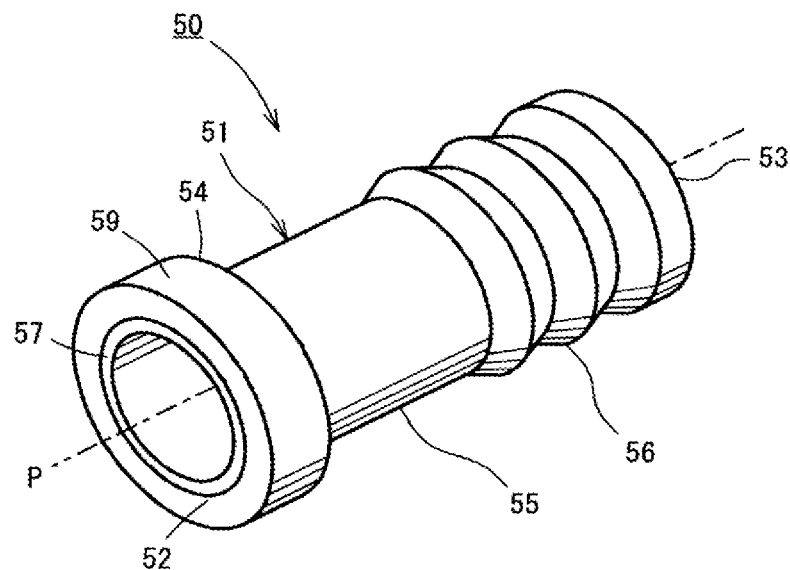
FIG. 4A is a perspective view of a cylinder boot according to the embodiment of the present disclosure.
Figure 4B:
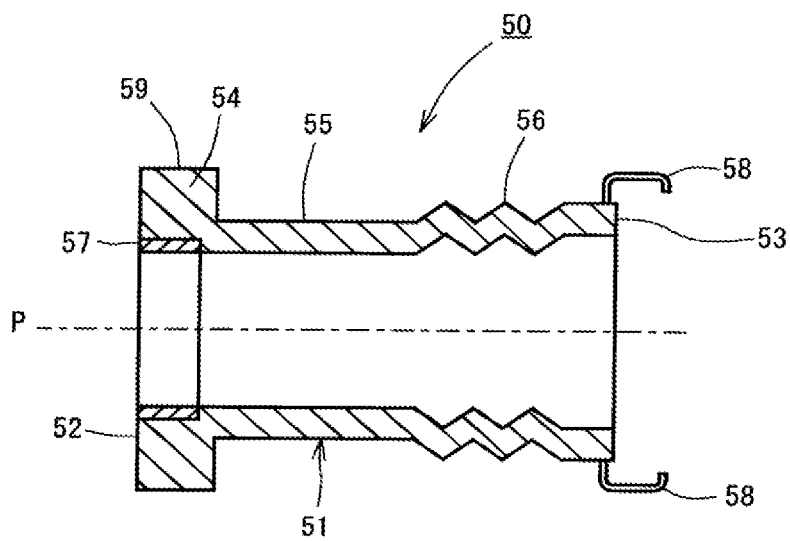
FIG. 4B is a longitudinal cross-sectional view of the cylinder boot according to the embodiment of the present disclosure.

Each cylinder rod 47 has a cylinder boot 50 for a front axle (hereinafter simply referred to as "the cylinder boot 50"). The cylinder boot 50 is mounted to the cylinder rod 47 to protect the cylinder rod 47. As illustrated in FIGS. 4A and 4B, the cylinder boot 50 includes a cylinder boot body 51, a rod-side fixing portion 52, a cylinder-side fixing portion 53, and a flange portion 54.

The cylinder boot body 51 is made of a rubber material and has flexibility. The cylinder boot body 51 has a cylindrical portion 55 covering the cylinder rod 47, and a bellows-shaped cylindrical portion 56 extending in an axial direction of the cylinder rod 47 (an axial center P direction) from an end portion of the cylindrical portion 55. The bellows-shaped cylindrical portion 56 serves as a contractable portion of the cylinder boot body 51, and is configured to absorb an extension stroke and a contraction stroke of the cylinder rod 47. In a state where the cylinder boot 50 is mounted on the cylinder rod 47, the cylindrical portion 55 is positioned adjacent to the distal end portion 48, and the bellows-shaped cylindrical portion 56 is positioned adjacent to the cylinder body 46.

The rod-side fixing portion 52 is disposed at one end portion of the cylinder boot body 51. The rod-side fixing portion 52 includes a ring member 57 fixed to an inner peripheral surface of the one end portion of the cylinder boot body 51. The distal end portion 48 of the cylinder rod 47 is fixed to the rod-side fixing portion 52 by press-fitting (see FIG. 3). As illustrated in FIG. 4B, the cylinder-side fixing portion 53 is disposed at one end portion of the bellows-shaped cylindrical portion 56, which serves as the other end portion of the cylinder boot body 51. The cylinder-side fixing portion 53 includes a locking member 58 that is capable of being fixed to an end portion of the cylinder body 46 adjacent to the cylinder rod 47. The locking member 58 is not illustrated in FIG. 4A.

The flange portion 54 has an outer diameter that is larger than an outer diameter of the cylindrical portion 55, and is formed on radially outer portion of the rod-side fixing portion 52. The flange portion 54 is formed on a circumference of the cylinder boot body 51 along a circumferential direction of the cylinder boot body 51. The flange portion 54 is displaced by extension or contraction of the cylinder rod 47 in a direction (a direction of the axial center P) in which the cylinder rod 47 extends or contracts. The flange portion 54 corresponds to a detection portion of the present disclosure that is detected by a detection sensor 60, which will be described below. The flange portion 54 has a reflection surface 59 for reflecting light on an outer peripheral surface thereof.

As illustrated in FIG. 3, the detection sensor 60 is mounted on a lower surface of the upper plate 32 of the front beam axle 27 via a bracket 61 to detect that the cylinder rod 47 has exceeded a predetermined stroke. The detection sensor 60 is a reflective optical sensor and includes a light-emitting portion and a light-receiving portion (not illustrated) to detect the flange portion 54 in a non-contact manner. When the flange portion 54 is brought close to the detection sensor 60 by the contraction of the cylinder rod 47, the reflection surface 59 of the flange portion 54 reflects a sensor light that is emitted from the light-emitting portion of the detection sensor 60 so that the light-receiving portion of the detection sensor 60 detects the reflected light and thus transmits a detection signal to the controller 22.

The extension and contraction of the cylinder rod 47 is proportional to the steering angle of the steered wheels 14, the controller 22, upon receiving the detection signal, detects that the steering angle has exceeded a predetermined steering angle. The mounting position of the detection sensor 60 on the upper plate 32 only has to be determined relative to the position of the flange portion 54 so as to correspond to a predetermined steering angle for detection.

Figure 5A:
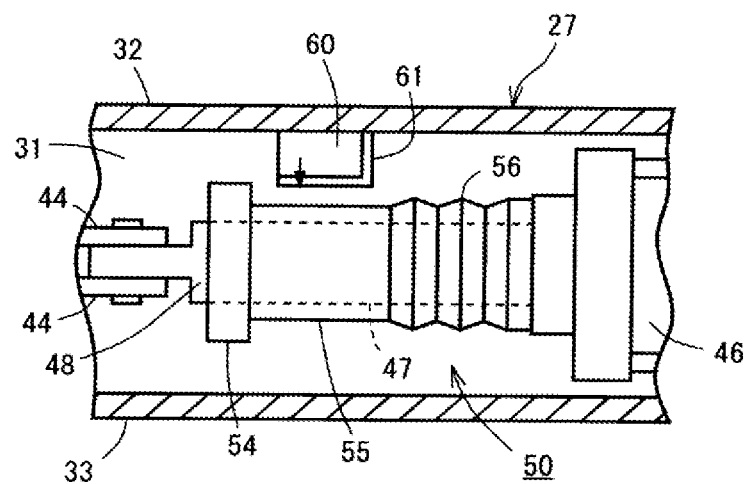
FIG. 5A is a front view of the cylinder boot when the steering angle is 0°.

Next, the operation of the cylinder boot 50 of the present embodiment will be described. When the tow tractor 10 travels in a straight line, the steering angle is 0°, as illustrated in FIG. 5A that illustrates the cylinder boot 50 disposed on the right side when viewed from the operator. The cylinder rod 47 is extended when the steering angle is 0°, and the flange portion 54 of the cylinder boot 50 is positioned on the right side (adjacent to the tie rod 44) of the detection sensor 60. Therefore, the detection sensor 60 does not detect the flange portion 54, which corresponds to the detection portion, and does not transmit a detection signal. The orientation of the sensor light emitted from the detection sensor 60 is indicated by an arrow.

Figure 5B:
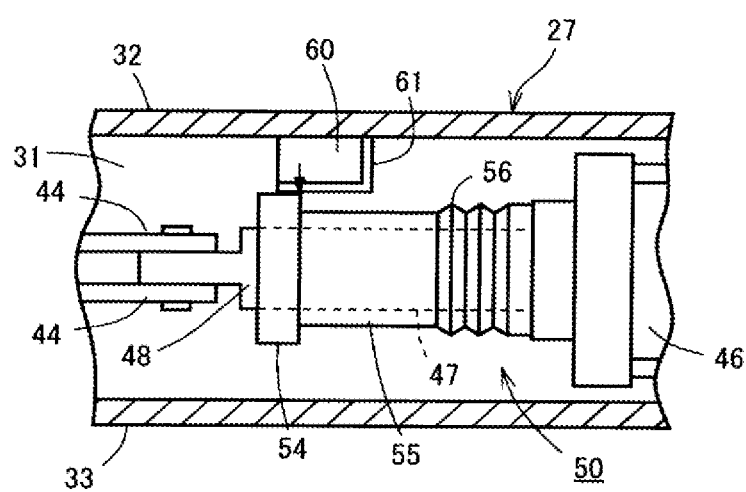
FIG. 5B is a front view of the cylinder boot when the detection sensor detects a flange portion.

Next, when the hydraulic cylinder 45 is operated by leftward steering, the cylinder rod 47 for steering the right steered wheel 14 contracts, and the associated flange portion 54 moves toward the cylinder body 46 with the contraction of the cylinder rod 47. The bellows-shaped cylindrical portion 56 is thus deformed to contract with the movement of the flange portion 54. As illustrated in FIG. 5B, the flange portion 54 approaches the detection sensor 60, and the detection sensor 60 detects the flange portion 54. When the detection sensor 60 detects the flange portion 54, the detection sensor 60 transmits a detection signal to the controller 22. Upon receiving the detection signal, the controller 22 detects that the steering angle has exceeded the predetermined steering angle. When the cylinder rod 47 for steering the right steered wheel 14 contracts, the other cylinder rod 47 for steering the left steered wheel 14 extends so that the left flange portion 54 approaches the left steered wheel 14 from the position of the flange portion 54 when the steering angle is 0°.

The cylinder boot 50 according to the present embodiment has the following advantageous effects.

(1) The cylinder boot 50 covers the associated cylinder rod 47 of the steering hydraulic cylinder 45 to protect the cylinder rod 47. The cylinder boot 50 includes the flange portion 54, which corresponds to the detection portion of the present disclosure, and the detection sensor 60 provided on the front beam axle 27 detects the flange portion 54 that is displaced by the extension and contraction of the cylinder rod 47. This configuration allows the cylinder boot 50 to serve as a detection object, which is detected by the detection sensor 60, while surely protecting the cylinder rod 47. Therefore, this configuration eliminates the need for the provision of a detection object on the steering knuckle 36 or the like, thereby enabling reduction of the number of components of the front axle 26 and a space saving in the front axle 26.

(2) The flange portion 54 is formed on the circumference of the cylinder boot body 51 along the circumferential direction of the cylinder boot body 51. This configuration eliminates the need for alignment of the flange portion 54 with the cylinder rod 47 in the circumferential direction of the cylinder boot body 51 when the cylinder boot 50 is mounted to the cylinder rod 47. Even if the cylinder rod 47 rotates about the axial center P, this configuration allows the flange portion 54 to be detected by the detection sensor 60.

(3) The distal end portion 48 of the cylinder rod 47 is fixed to the rod-side fixing portion 52 by press-fitting. This configuration eliminates the need for a means or a member for fixing the distal end portion 48 of the cylinder rod 47 to the rod-side fixing portion 52, thereby reducing the number of components of the front axle 26.

(4) The flange portion 54 is detected by the detection sensor 60 in a non-contact manner. Therefore, the flange portion 54 is not brought into contact with the cylinder rod 47, and does not hinder extension and contraction of the cylinder rod 47.

(5) The flange portion 54 has the reflection surface 59 that reflects the sensor light emitted from the detection sensor 60. This allows the detection sensor 60 to use a reflective optical sensor that emits a sensor light and detects the reflected sensor light. The provision of the reflection surface 59 allows the detection portion to be formed regardless of the material of the cylinder boot body 51.

(6) The cylinder boot 50 includes the flange portion 54 that corresponds to the detection portion of the present disclosure, and the detection sensor 60 is disposed in a space surrounded by the upper plate 32, the lower plate 33, and the base plate 31 of the front beam axle 27. This configuration allows the detection sensor 60 and the flange portion 54 to be unlikely to get dirty and unlikely to interfere with foreign matters, such as a stone, which may fly toward them while the vehicle travels, thereby increasing the durability of the detection sensor 60 and the flange portion 54.

Figure 6A:
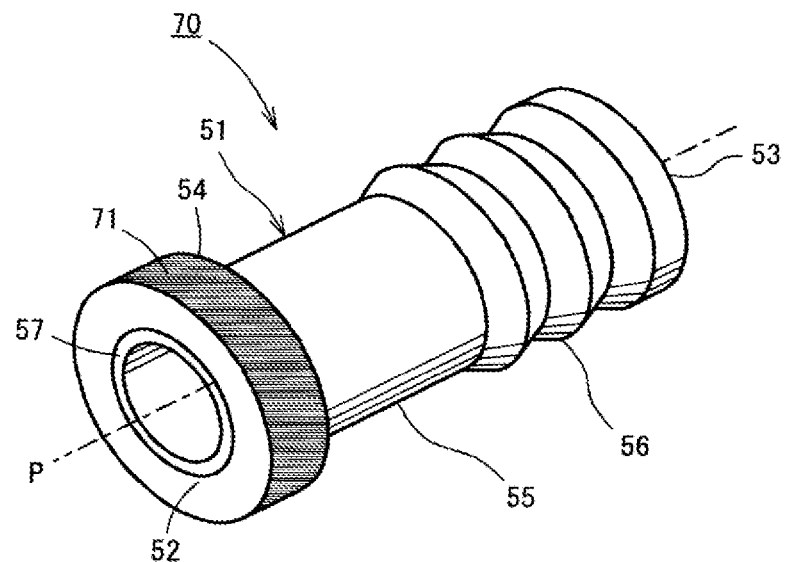
FIG. 6A is a perspective view of a cylinder boot according to another example 1.

Next, a cylinder boot 70 according to another example 1 will be described. In the cylinder boot 70 according to another example 1 illustrated in FIG. 6A, the flange portion 54 has an outer peripheral surface 71 that is formed of a metal coating and corresponds to the detection surface of the present disclosure. The cylinder boot 70 according to another example 1 allows the detection sensor 60 to use a proximity sensor instead of an optical sensor. For example, since the outer peripheral surface 71, which is the detection surface, is made of metal, this configuration allows to use an inductive proximity sensor that detects magnetic loss caused by proximity of the outer peripheral surface 71.

Figure 6B:
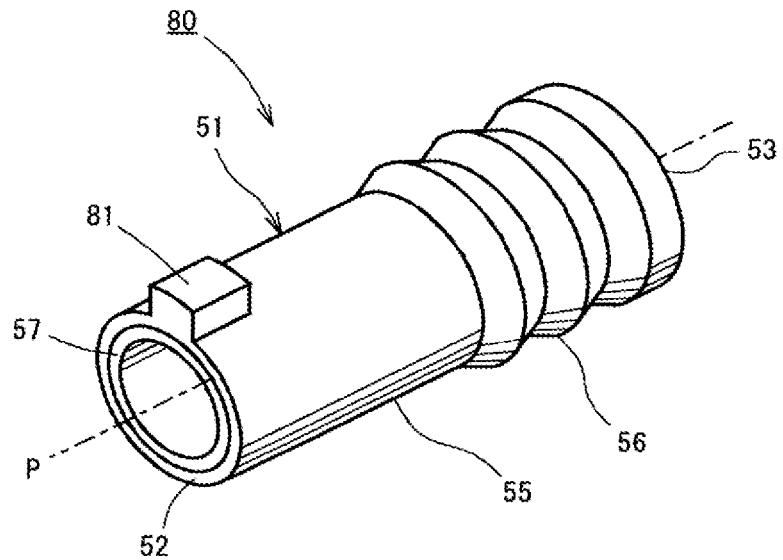
FIG. 6B is a perspective view of a cylinder boot according to another example 2.
Figure 7:
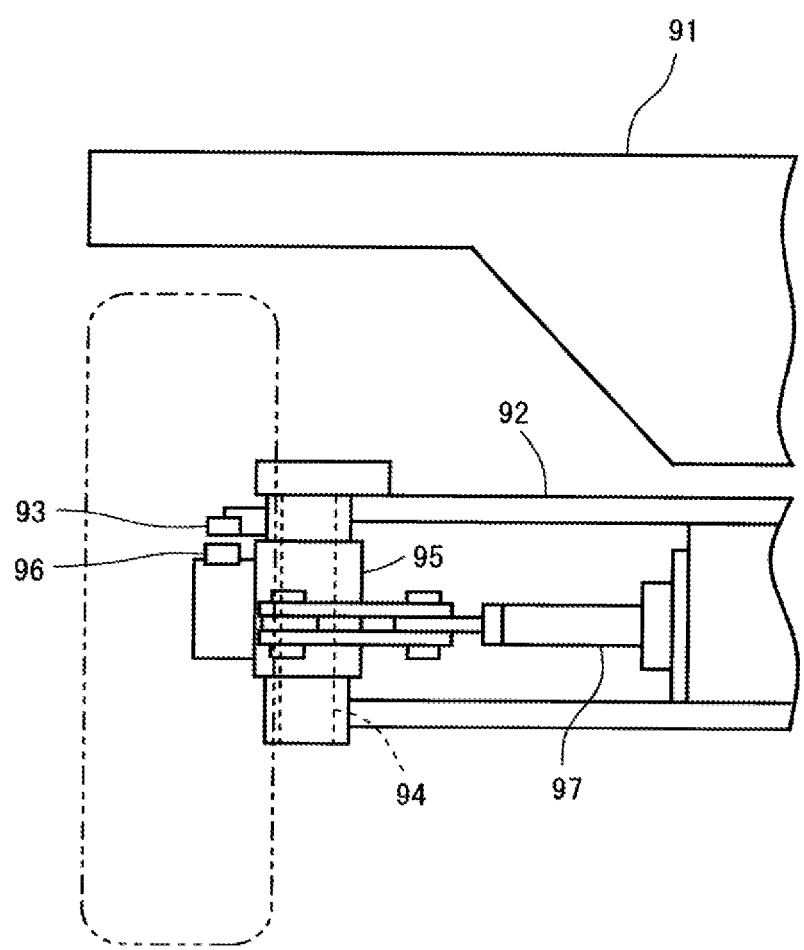
FIG. 7 is a front view illustrating a detection sensor of an beam axle and a detection object of a steering knuckle according to a conventional art.

Next, a cylinder boot 80 according to another example 2 will be described. The cylinder boot 80 according to another example 2 illustrated in FIG. 6B has a projection portion 81 that corresponds to the detection portion of the present disclosure and is configured to face the detection sensor 60, instead of a flange portion formed on the circumference of the cylinder boot body 51 along the circumferential direction of the cylinder boot body 51. The projection portion 81 is formed on an outer peripheral surface of the cylinder boot body 51 adjacent to the rod-side fixing portion 52. The projection portion 81 is displaced in the axial direction of the cylinder rod 47 by the extension and contraction of the cylinder rod 47. The cylinder boot 80 according to another example 2 allows weight reduction and material reduction of the cylinder boot 80.

The present disclosure is not limited to the above embodiment (including the examples), and various modifications can be made within the scope of the gist of the disclosure, and for example, the following modifications may be made.

In the above embodiment (including the examples), the detection portion and the rod-side fixing portion of the cylinder boot for an axle are located at substantially the same position in the axial direction of the cylinder rod. However, the present disclosure is not limited thereto. The detection portion and the rod-side fixing portion of the cylinder boot for an axle may be located at different positions in the axial direction of the cylinder rod.

In the above embodiment (including the examples), the distal end portion of the cylinder rod of the cylinder boot for an axle is fixed to the rod-side fixing portion by press-fitting. However, the present disclosure is not limited thereto. The distal end portion of the cylinder rod of the cylinder boot for an axle may be fixed to the rod-side fixing portion, for example, by a bolt or a fixing means other than press-fitting.

In the above embodiment (including the examples), the cylinder boot body includes the bellows-shaped cylindrical portion that corresponds to the contractable portion of the present disclosure. However, the present disclosure is not limited thereto. The contractable portion of the cylinder boot body may have any shape as long as the contractable portion can contract in response to the stroke of the cylinder rod. The contractable portion of the cylinder boot body may be formed by a part or the whole of the cylinder boot body.

In the above embodiment (including the examples), the detection sensor detects the detection portion of the cylinder boot for an axle in a non-contact manner. However, the present disclosure is not limited thereto. The detection sensor may be a contact type sensor that comes into contact with the detection portion, such as a limit switch, to detect the detection portion.

In the above embodiment (including the examples), the flange portion or the projection portion is formed integrally with the cylinder boot body. However, the present disclosure is not limited thereto. The flange portion or the projection portion may be a member that is formed separately from the cylinder boot body and may be attached to the cylinder boot body.

The above embodiment (including the examples) mentions a tow tractor that corresponds to the industrial vehicle of the present disclosure. However, the industrial vehicle is not limited to a tow tractor, and may be, for example, a forklift. When a forklift serves as the industrial vehicle of the present disclosure, the cylinder boot for an axle of the present disclosure is mounted on a cylinder rod of a steering hydraulic cylinder of a rear axle of the forklift.

What is claimed is:

1. A cylinder boot for an axle of an industrial vehicle, the industrial vehicle having a beam axle, a steering knuckle pivotably supported by the beam axle and a steering hydraulic cylinder supported by the beam axle, a cylinder rod of the steering hydraulic cylinder being connected to the steering knuckle to pivot the steering knuckle, wherein the cylinder boot covers the cylinder rod of the steering hydraulic cylinder, the cylinder boot comprising:
   a cylinder boot body that has a contractable portion that is contractable in response to a stroke of the cylinder rod;
   a rod-side fixing portion of the cylinder boot body that is fixed to a distal end portion of the cylinder rod;
   a cylinder-side fixing portion of the cylinder boot body that is fixed to a cylinder body of the steering hydraulic cylinder; and
   a detection portion that is displaced in a direction in which the cylinder rod extends or contracts, and is detected by a detection sensor disposed on the beam axle;
   wherein the detection portion is formed integrally with the cylinder boot body, or the detection portion is formed separately from the cylinder boot body and is attached to the cylinder boot body.

2. The cylinder boot for the axle of the industrial vehicle according to claim 1, wherein the detection portion is formed on a circumference of the cylinder boot body along a circumferential direction of the cylinder boot body.

3. The cylinder boot for the axle of the industrial vehicle according to claim 1, wherein the distal end portion of the cylinder rod is fixed to the rod-side fixing portion by press-fitting.

4. The cylinder boot for the axle of the industrial vehicle according to claim 1, wherein the detection portion is detected by the detection sensor in a non-contact manner.

5. The cylinder boot for the axle of the industrial vehicle according to claim 4, wherein the detection portion has a detection surface that is formed of a metal coating.

6. The cylinder boot for the axle of the industrial vehicle according to claim 4, wherein the detection portion is formed integrally with the cylinder boot body.

7. The cylinder boot for the axle of the industrial vehicle according to claim 4, wherein the detection portion is formed separately from the cylinder boot body and is attachable to the cylinder boot body.

* * * * *